United States Patent [19]

Dorner et al.

[11] Patent Number: 5,030,058

[45] Date of Patent: Jul. 9, 1991

[54] METHOD FOR STACKING ARTICLES AND FEEDING THE STACKS TO A DISCHARGE SITE

[75] Inventors: Wolfgang C. Dorner, Oconomowoc; Michael A. Hosch, Hartland, both of Wis.

[73] Assignee: Dorner Mfg. Corp., Hartland, Wis.

[21] Appl. No.: 357,098

[22] Filed: May 26, 1989

Related U.S. Application Data

[62] Division of Ser. No. 118,534, Jan. 9, 1987, Pat. No. 4,861,226.

[51] Int. Cl.⁵ .............................................. B65G 61/00
[52] U.S. Cl. ................................. 414/786; 198/463.4; 198/468.11; 414/789.9; 414/798.4
[58] Field of Search .................... 271/177, 180, 181; 414/789.9, 790.3, 790.2, 789, 798.7, 786, 798.4; 198/429, 430, 463.4, 468.11

[56] References Cited

U.S. PATENT DOCUMENTS

| | | | |
|---|---|---|---|
| 1,433,328 | 10/1922 | Wright | 198/457 |
| 1,703,466 | 2/1929 | Wright | 414/108 X |
| 3,388,815 | 6/1969 | Lingl | 198/430 X |
| 3,869,036 | 3/1975 | Peters et al. | 414/798.4 |

FOREIGN PATENT DOCUMENTS 1094233 12/1960 Fed. Rep. of Germany ...... 271/218

OTHER PUBLICATIONS

Copies of these references were supplied during the prosecution of parent application Ser. No. 118534.

Primary Examiner—Robert J. Spar
Assistant Examiner—Janice Krizek
Attorney, Agent, or Firm—Andrus, Sceales, Starke & Sawall

[57] ABSTRACT

A method for stacking small articles in a side-by-side stack and feeding the stacks to a discharge conveyor. A plurality of articles, such as small video cassette containers, are conveyed in an upright end-to-end relation on a first conveyor. As each article approaches the downstream end of the conveyor, it is pushed laterally across a platform against a movable backstop to form a side-by-side stack of articles. The stack is then transferred into a movable carriage and the carriage is moved to a position over a discharge conveyor. The end of the carriage facing downstream in the direction of movement of the discharge conveyor is provided with a movable gate and after the carriage is in position over the discharge conveyor the gate is opened to release the stack for movement on the discharge conveyor.

7 Claims, 3 Drawing Sheets

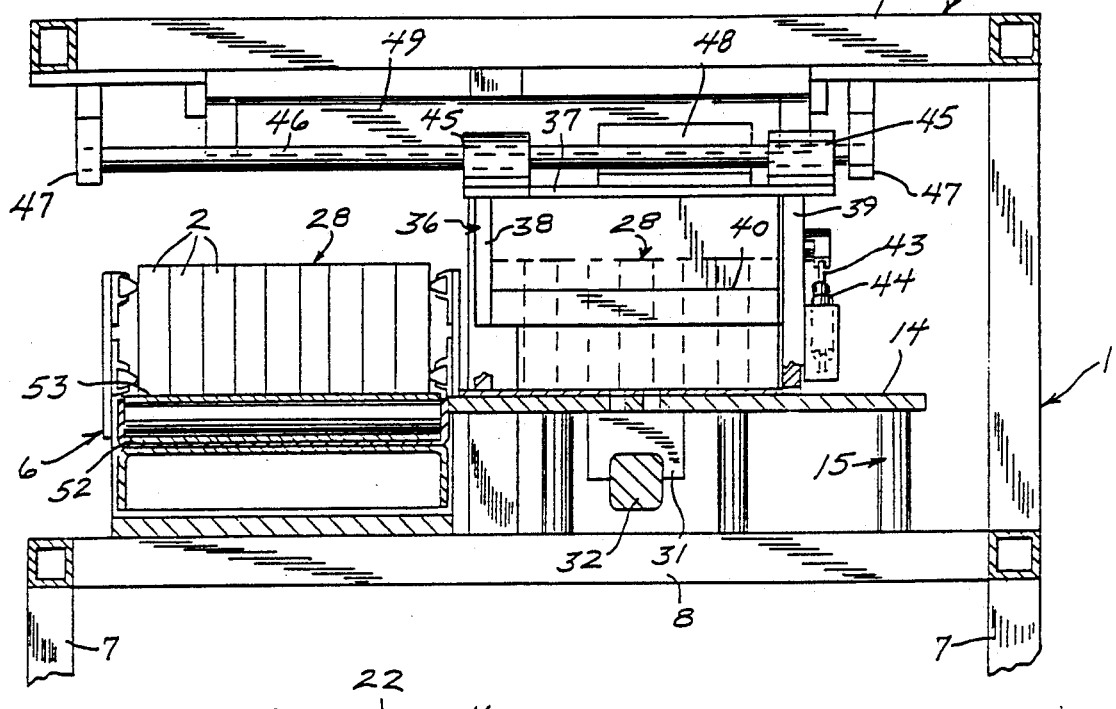
FIG. 4
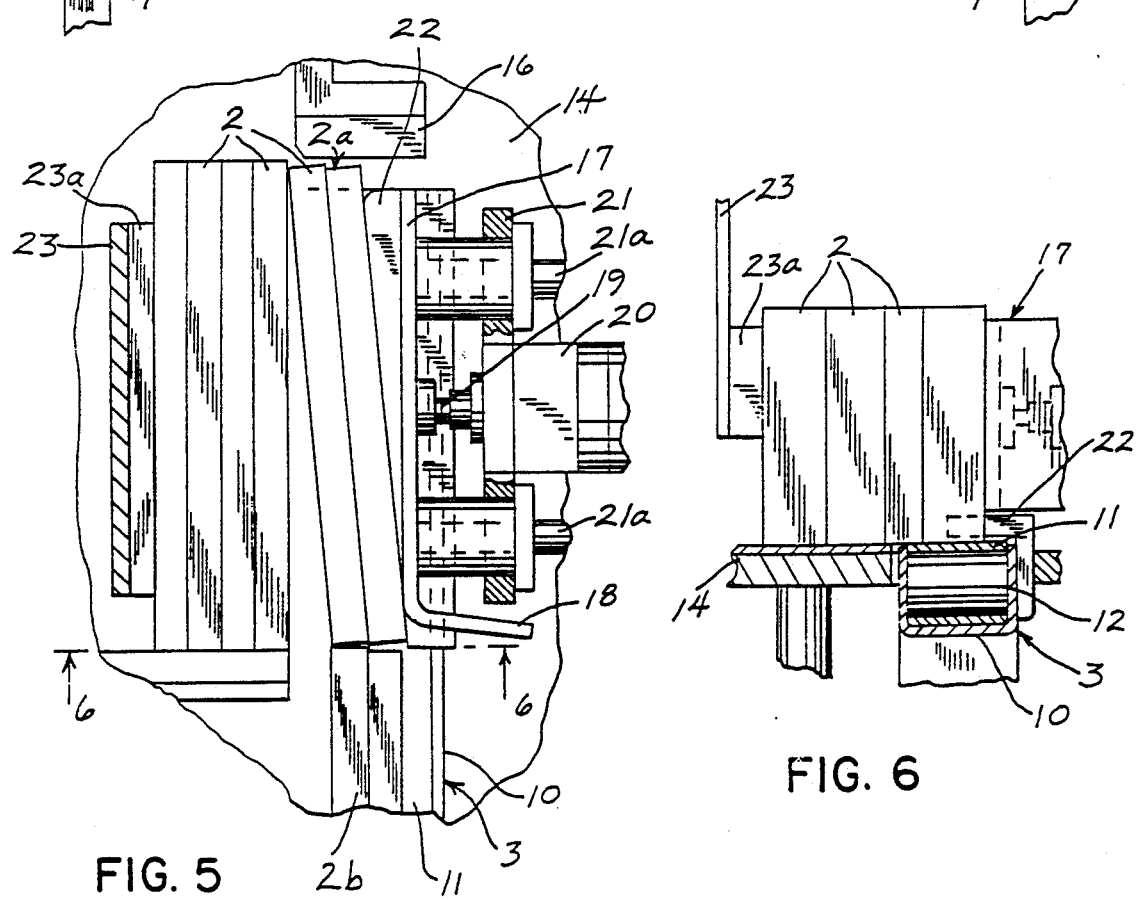
FIG. 5
FIG. 6

METHOD FOR STACKING ARTICLES AND FEEDING THE STACKS TO A DISCHARGE SITE

This is a division of application Ser. No. 07/118,534, filed Nov. 9, 1987, now U.S. Pat. No. 4,861,226.

BACKGROUND OF THE INVENTION

Conveying systems are often employed to convey small articles through a series of working stations. In certain conveyor systems, it is desired to stack a group of articles in side-by-side relation and transfer the stack to packaging or other working equipment. Frequently, a series of stacking units are utilized and the stacking units should be capable of automatically stacking the articles and feeding the stacks onto a discharge conveyor without interference between stacks.

SUMMARY OF THE INVENTION

The invention is directed to a method and apparatus for stacking articles and feeding the stacks to a discharge conveyor. A plurality of articles, such as small video cassette containers, jewelry boxes, or the like, are conveyed on an in-feed conveyor in an upright end-to-end relation. As each article approaches the downstream end of the conveyor, the article is pushed laterally from the conveyor onto a platform against a movable backstop to form a side-by-side stack of articles.

The stack is then transferred to a carriage which is mounted for movement between a stack-receiving position and a discharge position where the carriage is positioned over a discharge conveyor. The end of the carriage facing downstream in the direction of conveyor movement is provided with a movable gate, and after the carriage has been moved to the discharge position, the gate is opened to release the stack for movement on the discharge conveyor.

A sensing mechanism can be incorporated which controls the operation of the carriage and prevents movement of the carriage to the discharge position in the event there is another stack located immediately upstream on the discharge conveyor. This prevents interference between stacks being fed to the discharge conveyor.

The apparatus of the invention also has a provision for preventing interference between adjacent articles as they are pushed laterally from the infeed conveyor to form the stack. In this regard, certain articles, such as video cassette containers, are formed of two interlocking halves, and in some instances the halves may not be precisely aligned so the halves may be slightly offset. To prevent the offset half of one container from catching or hanging up on the offset half of an adjacent container, each container or article is pivoted or tilted slightly in a horizontal direction as it is being pushed from the conveyor.

Other objects and advantages will appear in the course of the following description.

DESCRIPTION OF THE DRAWINGS

The drawings illustrate the best mode presently contemplated of carrying out the invention.

In the drawings:

FIG. 4 is a section taken along line 4—4 of FIG. 1;

FIG. 5 is an enlarged fragmentary horizontal section showing the guide strip on the in-feed conveyor; and FIG. 6 is a section taken along line 6—6 of FIG. 5.

DESCRIPTION OF THE ILLUSTRATED EMBODIMENT

Figure 1:
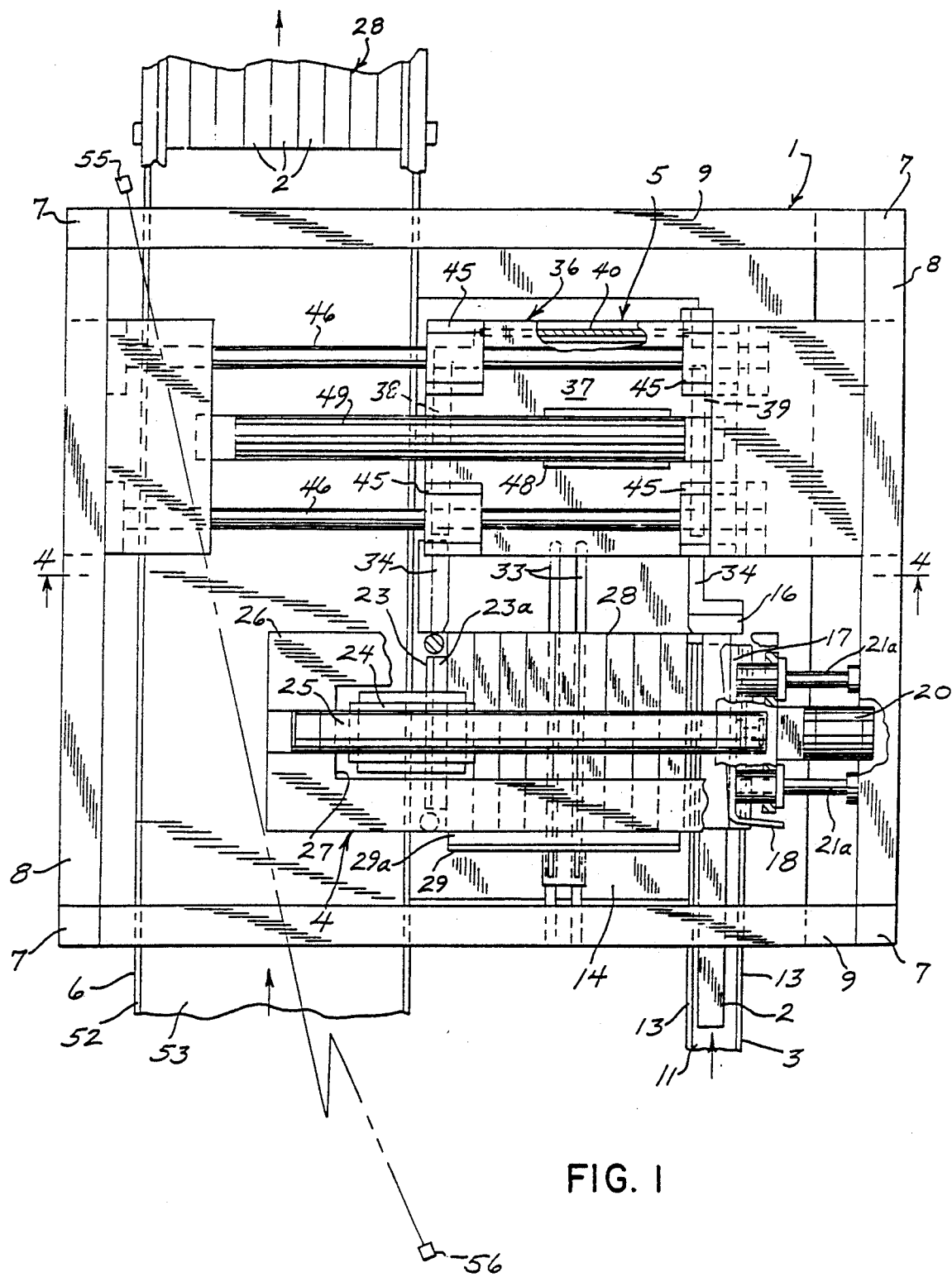
FIG. 1 is a top plan view of the apparatus of the invention.
Figure 2:
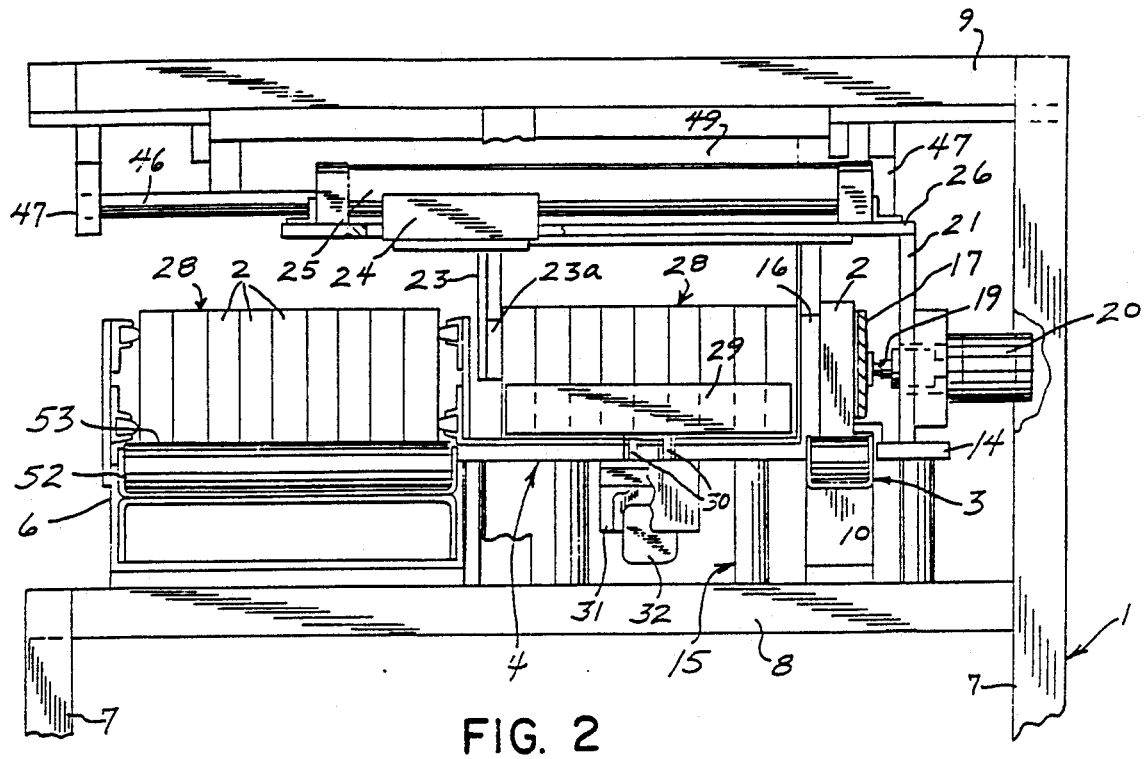
FIG. 2 is a end view of the apparatus.

The drawings illustrate an apparatus for stacking a plurality of small articles in side-by-side relation and transferring the stack onto a moving discharge conveyor. In general, the apparatus consists of a generally rectangular frame 1 and a plurality of articles 2 are conveyed into the frame on an in-feed conveyor 3. The articles 2, as illustrated, are generally flat containers, such as video cassette containers, which are conveyed edgewise in end-to-end relation on conveyor 3.

The articles 2 on conveyor 3 are stacked in side-by-side relation by a stacking unit 4 and the stack is then transferred to a transfer unit 5, which acts to move the stack onto a main conveyor 6. In practice, there may be a series of stacking and transfer units 4 and 5, acting to stack articles and transfer the stacks onto the conveyor 6.

Frame 1 includes a plurality of uprights or legs 7 which are located at the corners of the frame and the legs are connected by a series of horizontal beams 8. Two of the vertical legs 7 project upwardly above the stacking and transfer units 4 and 5 and carry a pair of upper horizontal beams 9 which are spaced above beams 8.

Conveyor 3 includes a frame 10 and a belt 11 is mounted for endless travel on frame 10. Belt 11 is trained over an idler pulley 12 and a drive pulley, not shown, which is driven in a conventional manner to drive the belt 11 in its endless path.

To prevent tilting of the articles 2 as they are conveyed on conveyor 3, a pair of guide rails 13 extend upwardly from either side of the frame 10 and define a guideway within which the articles travel. The articles 2 can be in end-to-end spaced relation on conveyor 3 or may be in end-to-end contacting relation.

A horizontal supporting surface or platform 4 is mounted through subframe 15 above the beams 8 of frame 1 and supporting surface 14 is located slightly beneath the level of the upper surface of belt 11.

A stop 16, as shown in FIG. 1, is positioned above the downstream end of conveyor 3 and as each article 2 moves along the conveyor it engages stop 16 to thereby stop its movement on the moving conveyor. With each article 2 stopped, it is then transferred laterally by operation of a pusher plate 17, which is normally positioned above one of the side edges of conveyor belt 11.

As best illustrated in FIG. 1, the upstream edge 18 of pusher plate 17 extends at a slight angle to a plane normal to the direction of movement of conveyor 3. When the pusher plate 17 moves across conveyor 3 to transfer the article 2 to supporting surface 14, the flange or edge 18 will stop movement of the next succeeding article 2 on the moving conveyor and thus eliminates the need for holding the next article back on the conveyor 3 during the transfer of the preceding article to platform 14.

To move pusher plate 17 in its reciprocating travel, a piston 19 slidable in cylinder 20 is connected to the rear surface of pusher plate 17. Cylinder 20 is mounted on a vertical plate 21 that extends upwardly from platform 14. Guide rods 21a are mounted on the rear surface of pusher plate 17 and slide within bushings on plate 21 to guide the pusher plate in movement.

When the conveying system is employed to convey video cassette containers which are composed of two interlocking halves, it has been found in some instances the halves are not perfectly aligned so that the leading and trailing edges of the containers may have misaligned edges, as illustrated by the containers 2a and 2b in FIG. 5. If the containers are in contacting end-to-end relation on conveyor 3, the misaligned edges may catch as the container or article is pushed onto the platform 14. To eliminate this problem, a guide 22 is positioned along a side edge of conveyor belt 11. As shown in FIG. 6, the guide 22 is located slightly above belt 11 and beneath pusher plate 17. Guide 22 extends at a slight angle of about 1° to 5° with respect to the side edge of the belt 11, and as the container 2a moves on the conveyor belt 11, it will be deflected, as shown in FIG. 5, toward the center line of the conveyor by guide 22, thus pivoting the trailing end of the container 2a away from the leading end of the following container 2b and preventing the possibility of the offset half of container 2a catching on the offset half of container 2b.

As the pusher plate 17 moves forwardly to engage the canted article 2, the article will pivot into a flatwise condition with the pusher plate and move onto platform 14. This pivoting action of each article produced by guide 22 eliminates the possibility of misaligned edges on the trailing end of a preceding article catching on the leading end of a succeeding article as the preceding article is pushed onto platform 14.

As the article 2 is pushed onto platform 14 it engages a movable backstop 23. Backstop 23 comprises a generally vertical plate that is supported from the carriage 24 of a rodless cylinder 25. The surface of backstop 23 can be covered with a plastic sheet, or other material having a low coefficient of friction, as indicated by 23A.

Cylinder 25 is mounted on a horizontal plate 26 that is spaced above platform 14 and supported by vertical plate 21 and upper beams 9. As shown in FIG. 1, plate 26 is provided with an elongated slot 27 which receives the movable carriage 24 of cylinder 25.

At the start of the stacking operation, backstop 23 is located adjacent conveyor 3, and as the first article of the stack is pushed from the conveyor by pusher plate 17 it will engage the backstop and move the backstop away from the conveyor. Each succeeding article will then be pushed by plate 17 against the preceding article to move backstop 23 in increments in a direction away from conveyor 3 to form a stack 28. During the stacking operation, cylinder 25 is not pressurized, so that the backstop 23 and carriage 24 can freely move with only friction of the piston of cylinder 25 resisting the movement.

When the desired number of articles 2 have been stacked the backstop 23 will be at the far end of the platform 14 and the resulting stack 28 of articles is then pushed across platform 14 to transfer unit 5 by pusher plate 29. A strip of nylon 29A or other material having a low coefficient of friction, can be attached to the surface of pusher plate 29. Pusher plate 29 is mounted for movement slightly above the level of platform 14, and a pair of depending arms 30 connect the pusher plate to the carriage 31 of a rodless cylinder 32 that is mounted beneath platform 14. Platform 14 is formed with a pair of parallel slots 33 which receive the arms 30 as seen in FIG. 1.

As the stack 28 is moved across the platform 14 to transfer unit 5, the ends of the stack are guided by a pair of guides 34 which extend upwardly from platform 14.

After stack 28 has been moved to transfer unit 5, cylinder 25 is pressurized to move back stop 23 to its original location adjacent conveyor 3, in position to receive a second stack.

Transfer unit 5 includes a movable carriage 36 composed of a horizontal top plate 37 and a pair of side plates 38 and 39. The side plate 38 facing conveyor 6 has a lesser height than side plate 39, as shown in FIG. 4.

Figure 3:
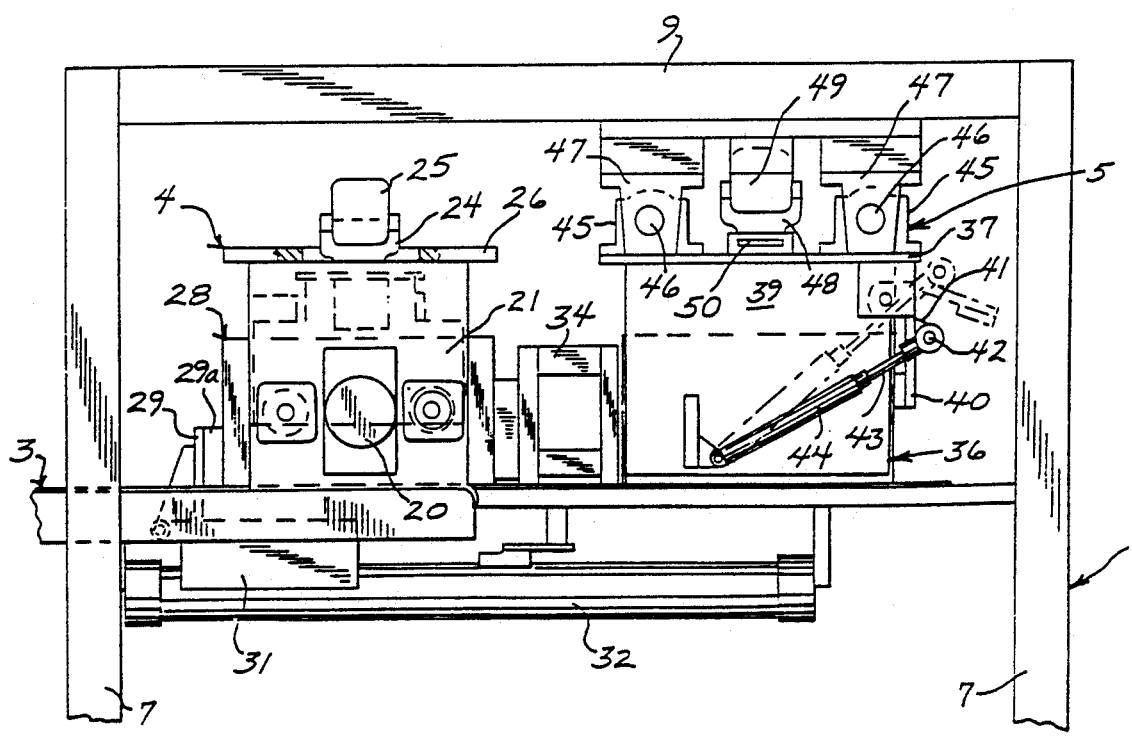
FIG. 3 is a side elevation of the apparatus.

Stack 28 is pushed into the open end of the carriage between side plates 38 and 39 and the opposite end of the carriage is enclosed by a movable gate 40 that extends between side plates 38 and 39. As best illustrated in FIG. 3, gate 40 can be pivoted between a downwardly hanging obstructing position and an inclined non-obstructing position, by a fluid cylinder unit. More particularly, gate 40 carries a pair of brackets 41 that support a horizontal shaft 42 that extends between side plates 38 and 39. Piston rod 43 of a pneumatic cylinder 44 is pivotally connected to the gate, while the cylinder 44 is pivotally attached through a bracket to side plate 39. By extending piston rod 43, gate 40 can be moved between the downwardly hanging or closed position and the inclined open position.

Gate 40 serves as a stop to prevent the articles 2 of the stack 28 from being individually carried away by the moving conveyor 6 as the stack is transferred to the conveyor. After the stack 28 is fully located over the conveyor 6, gate 40 is elevated to permit the stack to move on the conveyor and maintain the side-by-side stacked relationship of the articles.

Carriage 36 is mounted for movement in a direction transverse to the direction of movement of conveyors 3 and 6. In this regard, two pairs of bearing blocks 45 are mounted on top plate 37 and a pair of guide rods 46 are received in corresponding pairs of bearing blocks 45. Guide rods are connected through brackets 47 to the upper beams 9 of frame 1.

To move the carriage 36 along guide rods 46, the carriage 48 of a rodless cylinder 49 is connected to a plate 50 that is mounted on the upper surface of top plate 37. Movement of carriage 48 relative to cylinder 49 will thus move the carriage 36 from a receiving position, as shown in FIG. 1 where it receives a stack 28 from the stacking unit 4, to a discharge position, where the carriage is located above conveyor 6.

As the carriage 36 is moved to the discharge position, the stack 28 will slide laterally across platform 14 onto the moving belt of conveyor 6. Gate 40 is then moved to the open position through operation of cylinder 43, and the stack 28 will then be conveyed away on the conveyor 6.

Conveyor 6 is of conventional construction and includes a frame 52 which supports a belt 53 for endless travel. The upper surface of belt 53 is located slightly beneath the upper surface of platform 14.

A sensing system is utilized to insure that the stack 28 being transferred to conveyor 6 will not interfere with another stack moving on the conveyor. To provide this function, a pair of sensors 55 and 56, such as photoelectric sensors, are located diagonally along opposite sides of conveyor 6, as seen in FIG. 1. The operation of carriage 36 is controlled by the sensors. If the beam between the sensors 55 and 56 is unbroken, indicating that there is no stack 28 along the length of the beam, carriage 36 will be operated to move the stack 28 onto conveyor 6. On the other hand, if the beam between the sensors 55 and 56 is broken, indicating the presence of a stack at that location, the carriage 36 will not operate to move the stack 28 onto the conveyor.

The invention provides a compact unit for precisely stacking articles in a side-by-side relation and transferring the stack onto a moving conveyor. The apparatus has particular application for thin articles that are adapted to be stacked in side-by-side relation and the movement of the individual articles in the stack is controlled, so that tipping or misalignment of the articles is prevented.

The sensing mechanism which controls the operation of carriage 36 insures that the stack being transferred onto the discharge conveyor will not interfere with other stacks moving along the conveyor.

Various modes of carrying out the invention are contemplated as being within the scope of the following claims particularly pointing out and distinctly claiming the subject matter which is regarded as the invention.

I claim:

1. A method for stacking articles and feeding the stack to a discharge conveyor, comprising the steps of conveying a plurality of articles in end-to-end relation on a first conveyor, successively pushing each article laterally from said conveyor onto a fixed platform and into bearing engagement with a movable backstop to form a stack of side-by-side articles, transferring the stack laterally across said platform and onto a moving second conveyor while preventing movement of said stack in the direction of movement of said second conveyor, and thereafter simultaneously releasing all of the articles in the stack for movement on said second conveyor.

2. The method of claim 1, wherein the step of transferring the stack comprises feeding the stack into an open bottom carriage that is disposed above the platform and is offset laterally from said second conveyor, moving said carriage laterally to a position over said second conveyor and retaining said stack within said carriage, and thereafter releasing the stack from said carriage to permit said stack to move on said second conveyor.

3. A method of stacking articles in side-by-side relation comprising the steps of, conveying a plurality of articles in end-to-end upright relation on a moving generally horizontal conveyor, successively engaging a leading end of each article with a guide disposed at an acute angle to a side edge of the conveyor to tilt each article laterally in a horizontal plane and position said article on said conveyor at an acute angle with respect to the side edge of said conveor as each article reaches a predetermined position on said conveyor, and pushing each tilted article laterally from the conveyor to a receiving site to form a side-by-side stack of articles.

4. A method for stacking articles and feeding the stack to a discharge conveyor, comprising the steps of conveying a plurality of upright articles in end-to-end relation on a first conveyor, successively pushing each article laterally from said first conveyor into bearing engagement with a movable backstop to form a stack of side-by-side articles, feeding the stack into a first open end of a carriage having open opposite ends, positioning said carriage laterally of a second moving conveyor, moving said carriage laterally to a position over said second moving conveyor while retaining said stack within said carriage, and thereafter simultaneously releasing all of the articles of the stack from a second of said open opposite ends of said carriage to permit said stack to move on said second conveyor while maintaining alignment of said articles in said stack.

5. The method of claim 4, and including the step of mounting a gate at a second of said open ends of said carriage, said gate being movable from an obstructing position where said gate will obstruct the movement of a stack from said second end of the carriage to an unobstructing position, said step of releasing the stack comprising moving the gate from the obstructing position to the unobstructing position.

6. The method of claim 5, wherein said step of moving the gate comprises pivoting the gate from the obstructing position to the unobstructing position.

7. A method of stacking articles in side-by-side relation, comprising the steps of assembling a plurality of articles each from a pair of sections with the sections having abutting edges disposed along a peripheral joint, conveying a plurality of assembled articles edgewise on a conveyor in an upright end-to-end relation, tilting the downstream end of each assembled article laterally of the direction of movement of the conveyor while maintaining the article in an upright attitude on the conveyor to position the article at an acute angle with respect to a side edge of the conveyor and thereby position the portion of the joint located at the trailing end of the article out of contact with the leading end of the next succeeding article, and discharging each tilted article laterally from the conveyor to a receiving site to form a side-by-side stack of articles.

* * * * *